United States Patent [19]

Sabashi

[11] 4,009,639
[45] Mar. 1, 1977

[54] HYDRAULIC SWING MOTOR

[75] Inventor: Toshihiko Sabashi, Gifu, Japan

[73] Assignee: Kayabakogyo-Kabushiki-Kaisha, Tokyo, Japan

[22] Filed: Nov. 28, 1975

[21] Appl. No.: 636,044

Related U.S. Application Data

[63] Continuation of Ser. No. 473,440, May 28, 1974, abandoned.

[30] Foreign Application Priority Data

Aug. 9, 1973 Japan .................. 48-93172[U]

[52] U.S. Cl. .................. 91/25; 91/408; 91/443; 91/468
[51] Int. Cl.$^2$ .................. F15B 15/22; F15B 13/042
[58] Field of Search .................. 91/25, 26, 406, 407, 91/408, 409, 339, 376 A; 92/121, 122, 123, 124, 125

[56] References Cited

UNITED STATES PATENTS

| | | | |
|---|---|---|---|
| 2,902,009 | 9/1959 | Ludwig et al. | 91/408 |
| 3,070,959 | 1/1963 | Giampapa et al. | 91/339 |
| 3,207,048 | 9/1965 | Rumsey | 91/408 |
| 3,225,664 | 12/1965 | Rumsey | 91/408 |
| 3,303,746 | 2/1967 | Schmoeger | 91/26 |
| 3,470,792 | 10/1969 | Darling | 91/408 |
| 3,631,761 | 1/1972 | Rumsey | 91/408 |

Primary Examiner—Paul E. Maslousky
Attorney, Agent, or Firm—Saul Jecies

[57] ABSTRACT

A hydraulic swing motor which is provided so as to assure an improved cushioning effect near the end of its stroke and ultimately to make possible a reduction in the cushion stroke sector or an increase in the effective stroke, with fluid inlet and outlet passages at the casing being connected to chambers partitioned with a first vane fixed to the shaft side and a second vane fixed to the casing side and which are closed by means of the said first vane when the relative motion of the first and the second vanes nears its end, and with throttle valves to control the fluid discharge rate and relief valves to release the discharge fluid when its pressure rises beyond a certain limit in a section which remains open throughout the whole stroke.

6 Claims, 5 Drawing Figures

HYDRAULIC SWING MOTOR

This application is a continuation of Ser. No. 473,440 filed May 28, 1974, now abandoned.

BACKGROUND OF THE INVENTION

The present invention relates to a hydraulic swing motor which generates a reciprocating swing motion by means of a hydraulic fluid. More specifically, it relates to an improvement of the brake mechanism which is used to lessen the shock occurring at the stroke end by applying a braking force towards the end of the stroke.

Generally speaking, when the load on a hydraulic swing motor is increased, the increased inertia will make it difficult to reduce the speed of operation or to stop the movement. As the stroke nears its end, therefore, there will be a considerable shock, with the danger of damage to the mechanical members.

In the past several countermeasures have been adopted to produce a cushioning effect. Namely, the discharge port has been separated into several units or made into a slender opening elongated circumferentially near the end of th stroke so as to be closed gradually by the vane before the swing stroke nears its end and so to produce a cushioning effect due to a decrease in the fluid discharge rate.

Even though such means as the above may work satifactorily when the load on the hydraulic motor is relatively small, they suffer from the defect that as the load is increased a fairly extensive cushion stroke zone becomes necessary to lower the stroke speed or to stop it smoothly by applying an adequate braking force while preventing abnormal pressure rises, and also that the effective stroke length or effective work is reduced after deducting the said cushion stroke sector.

SUMMARY OF THE INVENTION

The purpose of the present invention, therefore, is to offer an improved brake mechanism which is used for hydraulic swing motors and produces an excellent braking effect with a relatively small cushion stroke sector.

To achieve this, the present invention employs a fluid inlet and outlet passage which is closed by the vane near the end of the swing stroke, and a throttle valve and relief valve which is never closed throughout the whole stroke. Thus, the said throttle valve limits the discharge rate of the working fluid during the cushion stroke and exerts a braking force on the swing motor. In addition, the relief valve operates at the surge pressures arising there and prevents the fluid pressure on the discharge side from rising beyond a certain limit.

In this way, the brake mechanism of the present invention limits the maximum pressure of the working fluid on the discharge side according to the swing speed and the load, absorbing and retaining a large amount of energy so as to effect a satisfactory braking action with a relatively small cushion stroke sector.

Referring to a preferred embodiment shown in the appended drawings, an explanation of the present invention will be given below so that the foregoing and other objectives, features and performance may be realized.

DESCRIPTION OF THE PREFERRED EMBODIMENT

Figure 1:
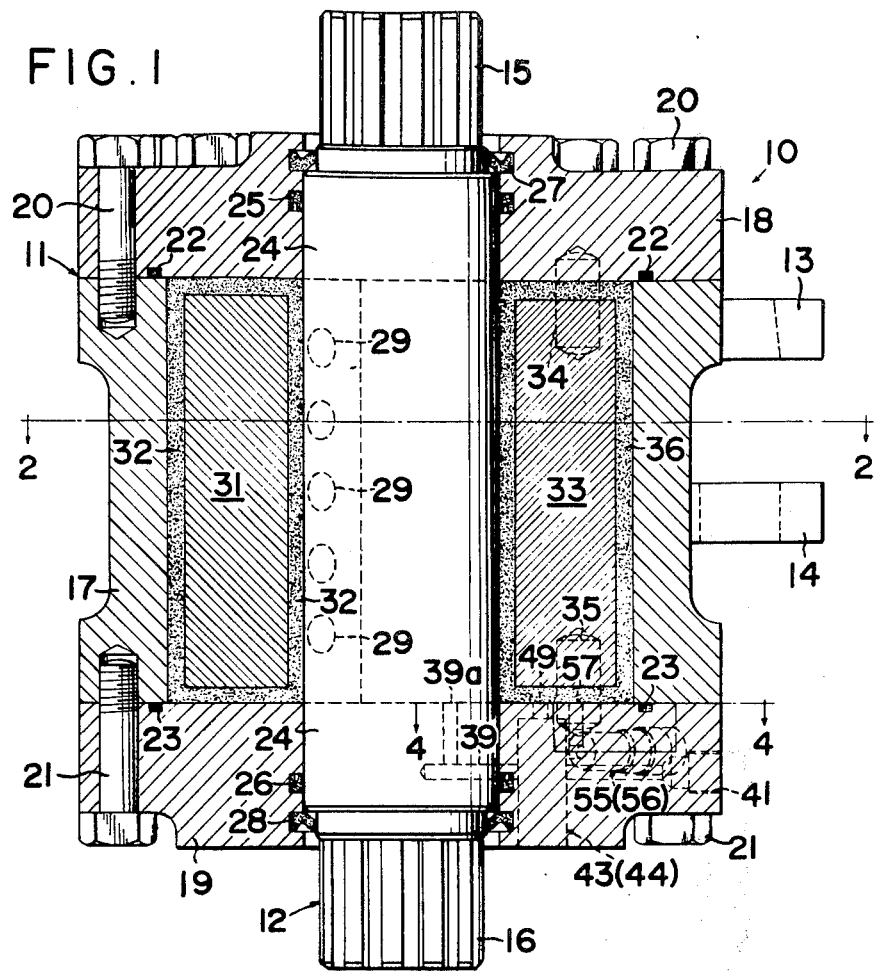
FIG. 1 represents a longitudinal section showing an embodiment of the present invention in a hydraulic swing motor.

In FIG. 1, the hydraulic swing motor 10 consists of a casing structure 11 and a shaft structure 12 which is inserted into the said casing structure so as to rotate relative to it. The casing structure 11 is provided with brackets 13, 14 protruding laterally. These brackets 13, 14 are used for fixing the casing structure 11 to an object (not shown in the figure). The shaft structure 12 has splines 15, 16 on both its end sections, which protrude beyond the upper and lower surfaces of the casing structure 11. These splines 15, 16 are used for fitting the shaft structure 12 to a rotating object (not shown in the figure).

The said casing structure 11 includes an upright cylindrical barrel 17 attached by means of brackets 13, 14 and upper and lower plates 18, 19 enclosing its upper and lower ends. The upper and lower plates 18, 19 are fixed to the barrel 17 with bolts 20, 21 and sealed tight with packing 22, 23 along the surfaces in contact.

The shaft structure 12 is supported by the upper and lower plates 18, 19 of the casing structure 11 at the upper and lower sections of the round shaft 24 between the splines 15, 16 at its two extremities. Packing 25, 26 is arranged between the upper and lower plates 18, 19 and the round shaft 24 so as to prevent the fluid from leaking. In addition, seals 27, 28 are arranged in position so as to prevent external dust and other matter from penetrating the contact surfaces of the upper and lower plates 18, 19 and the round shaft 24.

Figure 2:
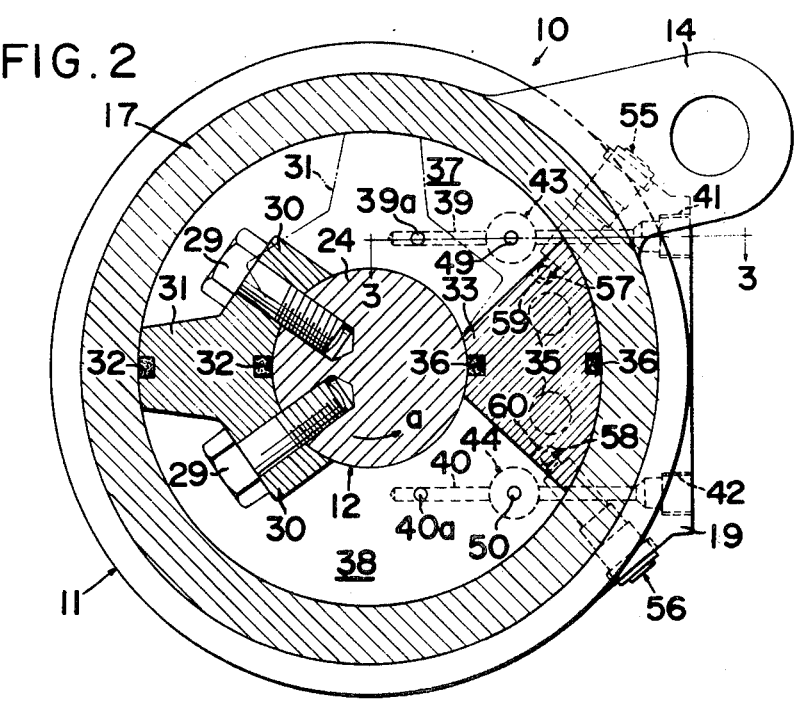
FIG. 2 represents a cross section along line 2—2 of FIG. 1.

As is evident from FIG. 2, the shaft structure 12 is provided with a first vane 31 which is located in the casing structure 11 and has a crescent-shaped section 30 fixed integrally to the round shaft 24 with bolts 29. The first vane 31 extends along the whole height of the inner fluid chamber of the casing structure 11 and its outer circumference contacts the inner surfaces of the barrel 17 and the upper and lower plates 18, 19. A groove is notched around this first vane 31 and fitted with packing 32 so as to seal each of the contact surfaces.

The second vane 33 is located inside the casing structure 11 and fixed to the upper and lower plates 18, 19 with pins 34, 35. The second vane 33 extends also along the whole height of the inner fluid chamber of the casing structure 11. A groove is notched around the second vane 33 and fitted with packing 36 so as to seal the contact surface between the outer circumference of the round shaft 24 of the shaft structure 12 and the inner surface of the casing structure 11. Thus, the said first and second vanes 31, 32 partition the inner fluid chamber of the casing structure 11 into two chambers 37, 38.

In order to effect the fluid supply and discharge for the chambers 37, 38, a pair of L-type fluid passages 39, 10 are located at the lower plate 19 of the casing structure 11. One end of each of these fluid passages 39, 40 opens externally as a screw coupling 41, 42 for hoses and the other end opens on the chambers 37, 38. Ports 39a, 40a of the fluid passages 39, 40 open to the chambers 37, 38, are located symmetrically with respect to the second vane 33 in the middle so as to be closed by the crescent section 30 of the first vane 31 on the side of the shaft structure 12 when it nears the end of its wing stroke.

In relation to the said fluid passages 39, 40, the lower plate 19 incorporates a pair of throttle valves 43, 44 and a pair of relief valves 55, 56, both of which are arranged symmetrically with respect to the second vane 33 in the middle.

Figure 3:
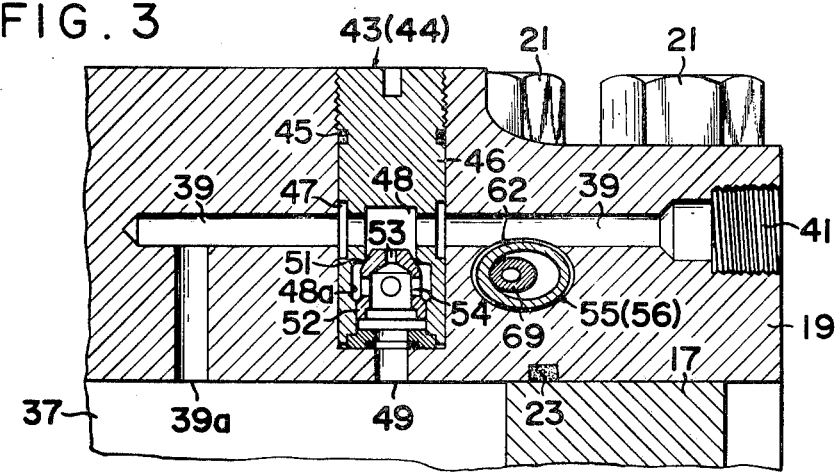
FIG. 3 represents a cross section of the lower plate cut along line 3—3 of FIG. 2 and shows the structure of the throttle valve.

As is evident from FIG. 3, each of the throttle valves 43, 44 involves a valve body 46 which is screwed tight with packing 45 into the lower plate 19. An annular groove 47 notched around the outer circumference of the valve body 46 is connected not only to the said fluid passage, 39 or 40, but also to a port, 49 or 50, which leads to the chamber 37 or 38, through an inner passage 48 bored in the valve body 46. These ports 49, 50 are located externally to the ports 39a, 40a of the fluid passages 39, 40 mentioned above, and are arranged symmetrically with respect to the second vane 33 in the middle so as not to be closed at all by the first vane 31 throughout the whole stroke of the shaft structure 12.

The inner passage 48 of the valve body 46 is expanded at the one end 48a to form a shoulder-shaped part 51 and a poppet valve 52 is arranged, sliding freely, at the end part 48a. The poppet valve 52 has an orifice 53 bored at the center and a passage 54 notched around the circumference. The poppet valve 52, therefore, will be pressed onto the shoulder-shaped part 51 due to the pressure difference between the chamber, 37 or 38, and the fluid passage, 39 or 40, when the fluid in the chamber, 37 or 38, flows from the port, 49 or 50, to the side of fluid passage 39 or 40. Thus, the fluid in the chamber, 37 or 38, will be discharged through the orifice 53 of the poppet valve 52 to the fluid passage, 39 or 40. Conversely, when the hydraulic fluid is supplied from the fluid passage, 39 or 40, the poppet valve 52 will leave the shoulder-shaped part 51, so that the hydraulic fluid may be supplied to the chamber, 37 or 38, through the orifice 53 and the circumferential passage 54 of the poppet valve 52.

The lower plate 19 has another pair of ports 57, 58 arranged also symmetrically with respect to the second vane 33. These ports 57, 58 are located under the second vane 33 and lead to the chambers 37, 38 respectively through passages 59, 60 formed in the second vane 33. Relief valves 55, 56 are arranged in relation to these ports 57, 58 and the fluid passages 39, 40 mentioned above.

Figure 4:
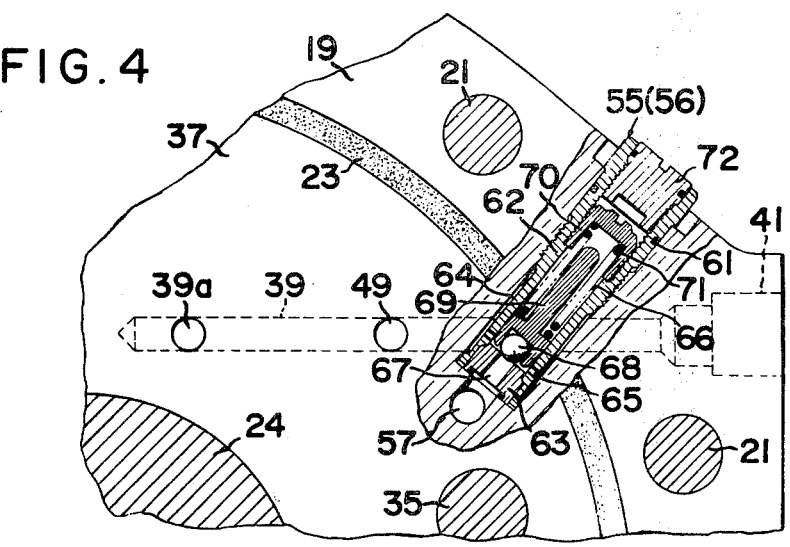
FIG. 4 represents another cross section of the lower plate cut along line 4—4 of FIG. 1 and shows the structure of the relief valve.

Each of the relief valves 55, 56 includes, as seen in FIG. 4, a valve body 62 screwed tight with packing 61 into the lower plate 19 and a valve-seat member 63 fitted to the top of the said valve body 62. An annular groove 64 notched around the circumference of the valve body 62 is connected not only to the side of the fluid passage, 39 or 40, crossing it, but also to the port, 57 and 58, mentioned above from a passage hole 65 bored in the valve body 62 through its inner passage 66 and the central passage 67 of the valve-seat member 63.

In the inner passage 66 of the valve body 62, a ball valve 68 is arranged so as to close the central passage 67 of the said valve-seat member 63 from inside. The ball valve 68 incorporates a spring 71 between its holder 69 arranged at the back and a control nut 70 screwed from the upper part of the inner passage 66 and is pressed by the force of this spring 71 onto the inner end of the central passage 67 of the valve-seat member 63. Accordingly, the ball valve 68 will leave the valve-seat member 63 to open the central passage 67 when the fluid pressure in the chamber, 37 or 38, rises beyond a critical point to exceed the spring 71 force. Thus, the fluid in the chamber, 37 or 38, will be discharged from the port, 57 or 58, to the side of the fluid passage, 39 or 40, while maintaining its pressure. The fluid pressure in the chamber, 37 or 38, at the time of the opening motion of the ball valve 68 may be controlled freely by screwing the control nut 70 back and forth by rotating it from outside after removing a cap body 72 screwed to the inner passage 66 at the upper end.

Thus, the hydraulic swing motor 10 fabricated as stated above according to the present invention works in the following manner.

In the case where a rotating object is swung laterally under conditions such that the casing structure 11 is fixed to an object by means of the brackets 13, 14 and that the rotating object is suppoted by the splines 15, 16 at the upper and lower ends of the shaft structure 12, the hydraulic fluid will be led to the fluid passage, either 39 or 40, by means of a switch valve (which is not shown in the figure) and simultaneously the pressure of the other fluid passage, either 39 or 40, will be reduced through the said switch valve.

When the first vane 31 is in the position indicated by the continuous line in FIG. 2, and when the hydraulic fluid is led to he fluid passage 39 side and the pressure in the other fluid passage 40 side is reduced, the hydraulic fluid will be supplied to the chamber 37 from the port 39a of the fluid passage 39 and the fluid in the other chamber 38 will be discharged from the port 40a through the fluid passage 40. As a result, the shaft structure 12 including the first vane 31 will start to move in the direction of the arrow mark a around the vertical axis of the fixed casing structure 11.

In this case, if the first vane 31 comes to one extremity of the swing stroke indicated by the dotted line in FIG. 2, the port 39a of the fluid passage 39 will be closed by the crescent section 30 of the first vane 31. Therefore, the hydraulic fluid led to the fluid passage 39 will part the poppet valve 52 of the throttle valve 43 from the shoulder-shaped part 51 and be supplied to the chamber 37 from its orifice 53 and circumferential passage 54 through the port 49. This hydraulic fluid will facilitate the initial motion of the first vane 31. When the port 39a which is first closed by the crescent part 30 of the first vane 31 is thus opened, the shaft structure 12 including the first vane 231 will continue its motion due to the hydraulic fluid supplied to the chamber 37 through the port 39a.

Accordingly, the rotating object which is supported by the upper and lower end splines 15, 16 of the shaft structure 12 will continue to move laterally integrally with the shaft structure 12.

As is evident from FIG. 2, when the shaft structure 12 including the first vane 31 nears the other extremity of its swing stroke, the crescent section 30 the first vane 31 will pass over the port 40a which opens onto the chamber 38 and close port 40a. The fluid in the chamber 38, therefore, can no longer discharge to the side of the passage 40 through the port 40a. As a result, the fluid in the chamber 38 will press the poppet valve 52 in the throttle valve 44 onto the shoulder-shaped part 51 through the port 50 and be discharged to the side of the fluid passage 40 through its orifice 53. Then, the discharge fluid from the chamber 38 will be subject to a hydraulic resistance due to the orifice 53 and the fluid pressure of the chamber 38 will rise. Furthermore, when the fluid pressure of the chamber 38 rises up to a predetermined point, the ball valve 68 in the relief valve 56 will be opened to release the fluid from the chamber 38 into the side of he fluid passage 49 from the port 58 and prevent the fluid pressure of the chamber 38 from rising beyond the predetermined value.

In this way, the swing motion of the shaft structure 12 and the rotating object which is fixed to it will be subject to a damping resistance after the port 40a is closed by the crescent section 30 of the first vane 31 and be gradually slowed due to the braking force before it is stopped completely. In addition, in cases where the rotation of the shaft structure 12 and the first vane 31 is reversed, the hydraulic fluid is supplied to the fluid passage 40 to reduce the presssure in the other fluid passage 39. Thus, the position of the poppet valve 52 in throttle valves 43, 44 and the motion of relief valves 55, 56 will be reversed with respect to the aforementioned case and the motion or rotation of the shaft structure 12 and the rotating object fixed to it will be changed over into the reverse direction.

In a conventional hydraulic swing motor of this kind, when its motion nears the end of the swing stroke, the effective area of the port on the discharge side will be reduced progressively with the advance of the first vane so as to lessen the inertia of the rotating object including the first vane. As a result, the characteristic curve in this case may be represented by the Curve C of FIG. 5, that is, the fluid pressure of the chamber on the discharge side will rise progressively from the point $n$ where the cushion effect is initiated. In order to keep the maximum fluid pressure of the chamber within tolerable limits and to give an adequate cushion effect, therefore, the stroke from the point $n$ where the cushion effect is initiated to the end has to be made comparatively long.

On the other hand, in the hydraulic swing motor of the present invention, the fluid pressure is kept within tolerable limits by means of relief valves which come into operation when the fluid pressure of the chamber on the discharge side rises up to a predetermined tolerable limit. This means that, in the case where the same cushion effect as with the conventional type is required, the characteristic curve from the point $m$ where the cushion effect is initiated to the end may be represented by the Curve D as shown in FIG. 5.

As stated above, in the case where the shaft structure swings at a constant speed, the cushion initiating point $m$ of the hydraulic swing motor of the present invention will be delayed in comparison with the corresponding point $n$ of the conventional type and make it possible to increase the effective stroke length to double that of the stroke S, that is, the difference between the two, in going and returning.

Figure 5:
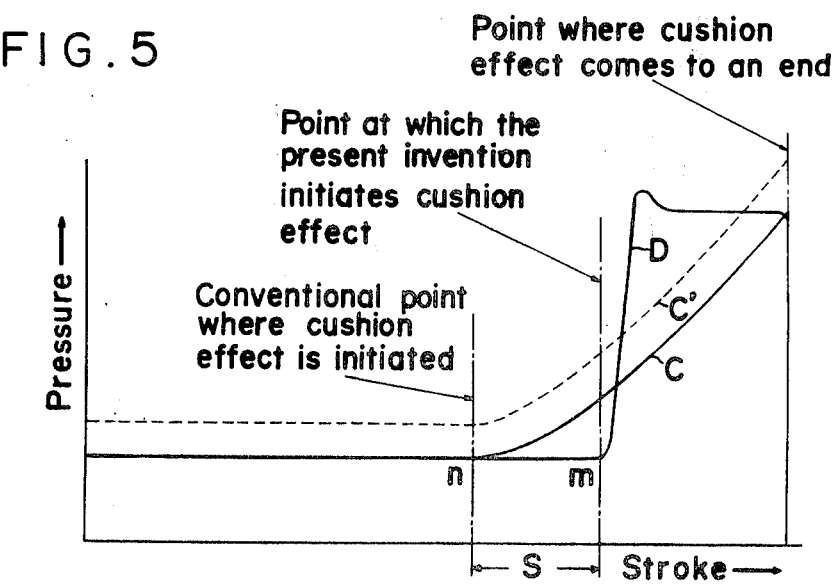
FIG. 5 represents a graph showing a comparison between characteristics of the brake mechanism of the present invention and that of conventional types.

In addition, the conventional hydraulic swing motor will have a characteristic curve such as that represented by the Curve C' of FIG. 5 when its swing speed is high, where the fluid pressure of the chamber on the discharge side will tend to rise beyond the predetermined limit and invite a danger of causing troublesome fluid leakage and damage to the mechanical members. Such dangers are eliminated, however, in the hydraulic swing motor of the present invention, because the fluid pressure of the chamber on the discharge side will never rise beyond the predetermined limit even if the swing speed is high.

What is claimed is:

1. A hydraulic swing motor, comprising
a casing having an annular center portion and two side plates closing opposite ends of said annular center portion;
a shaft journalled in said side plates and being rotatable in said center portion, said shaft defining with said casing a working chamber;
vane means subdividing said working chamber into two compartments and including a fixed first vane and a second vane mounted on said shaft for performing a swing stroke having two end positions;
a pair of hydraulic fluid inlet and outlet passages each having a first end portion commmunicating with the outside of said chamber and a second end portion,
each passage having a port connecting the respective end portion with one of said compartments and positioned to be closed by said second vane as the same approaches the respective end positions;
a pair of throttling valves each interposed in one of said passages and each communicating with one of said compartments intermediate said first vane and the respective end positions of said second vane for permitting only throttled escape of hydraulic fluid from the respective compartment subsequent to closing of the port in said compartment by said second vane;
and a pair of relief valves, both mounted within one of said side plates of said casing and each communicating with one of said compartments for limiting the maximum fluid pressure therein whereby, due to the pressure buildup resulting from the throttled escape of fluid subsequent to the closing of a port, a rapid braking of the swing stroke of said second vane occurs, but without danger of damage to said motor since the pressure build-up is quickly limited by the respective relief valve due to the location thereof within said one side wall close to the source of increased pressure and the point of initiation of said maximum fluid pressure.

2. A hydraulic swing motor as claimed in claim 1, wherin said passages and throttling valves are located within the confines of said casing, so that no parts are located externally of said casing and can become damaged.

3. A hydraulic swing motor as claimed in claim 1, wherein said relief valves each communicate with one of said passages.

4. A hydraulic swing motor as claimed in claim 1, wherein said relief valves are ball valves.

5. A hydraulic swing motor as claimed in claim 1, wherein said throttle valves comprise valve structure means operative to throttle only the flow of fluid out of the respective compartment to freely permit the flow of fluid into the respective compartment.

6. A hydraulic swing motor as claimed in claim 1, said casing having an inner circumferential surface bounding said chamber; and wherein said second vane has a pair of lateral portions each projecting into one of said compartments and adapted to close the respective port therein, and a center portion radially projecting intermediate said lateral portions into sealing relationship with said inner circumferential surface.

* * * * *